United States Patent [19]
Goldstein et al.

[11] Patent Number: 4,726,977
[45] Date of Patent: Feb. 23, 1988

[54] LAMINATED WEB

[75] Inventors: Guy Goldstein, Colmar; Yves Roussin-Moynier, Wintzenheim, both of France; Gareth Thomas, Boxley, United Kingdom; Guy Vanhoucke, Suresnes, France

[73] Assignee: Beghin-Say S.A., Thumeries, France

[21] Appl. No.: 870,763

[22] PCT Filed: Sep. 2, 1985

[86] PCT No.: PCT/FR85/00235
§ 371 Date: Jun. 16, 1986
§ 102(e) Date: Jun. 16, 1986

[87] PCT Pub. No.: WO86/01389
PCT Pub. Date: Mar. 13, 1986

[30] Foreign Application Priority Data
Sep. 3, 1984 [GB] United Kingdom ............... 8422221
Mar. 29, 1985 [GB] United Kingdom ............... 8508249

[51] Int. Cl.[4] ............................................. B32B 3/10
[52] U.S. Cl. ................................... 428/138; 428/137; 428/154; 428/142; 428/247; 428/535; 428/537.1

[58] Field of Search ............... 428/138, 110, 192, 284, 428/535, 537, 247, 913, 137, 154

[56] References Cited
U.S. PATENT DOCUMENTS

| | | | |
|---|---|---|---|
| 3,600,262 | 8/1971 | Frank | 428/233 |
| 3,639,199 | 2/1972 | Brandts et al. | 428/132 |
| 3,644,165 | 2/1972 | Chen | 428/132 |
| 3,700,536 | 10/1972 | Bentvelzen et al. | 428/138 |
| 3,708,383 | 1/1973 | Thomas et al. | 428/233 |
| 3,925,127 | 12/1975 | Yoshioka | 428/138 |
| 4,078,958 | 3/1978 | Patin | 428/192 |
| 4,335,070 | 6/1982 | Yazawa et al. | 428/192 |
| 4,481,243 | 11/1984 | Allen | 428/192 |
| 4,489,118 | 12/1984 | Endres et al. | 428/192 |

Primary Examiner—James J. Bell
Attorney, Agent, or Firm—A. W. Breiner

[57] ABSTRACT

A laminated web for use as a roll towel comprises a sheet of plastics scrim 2 between two layers of tissue paper 1. The edge portions of the towel are reinforced with plastics tapes 3 and threads 4. The tapes 3 prevent tearing of the towel across its width while the threads resist bursting of the towel in the regions normally grasped by a user.

7 Claims, 2 Drawing Figures

LAMINATED WEB

The invention relates to a laminated web for use as a roll towel.

There has long been a need for a satisfactory alternative to the cotton towels which are traditionally used in roll towel cabinets but which are very expensive to make and which are costly to launder. Attempts have been made to produce a roll of paper to replace the cotton rolls. The major drawback with these rolls in the past has been their susceptibility to rupture, especially when wet. Paper rolls have not, therefore, been satisfactory for use in cabinets where the used roll is re-reeled, since, if the towel breaks, the re-reeling can only be re-started by a janitor who must open up the cabinet. The main requirements of a paper product for use in this field are that it is highly absorbent and that it is strong.

Absorbency is provided in the present invention by two layers of tissue paper for example of the kind used in the manufacture of kitchen paper towel. To strengthen the tissue in use, i.e. when a user is drying his hands on the web, the two tissue layers are adhered to a perforated plastics film. This film maintains the integrity of the web when wet but also allows water to pass readily therethrough to ensure that the complete absorbing facility of both tissue layers is utilised.

In operation of a roll towel cabinet the towel may be subjected to very high forces as the towel is withdrawn from the cabinet. Since the towel is naturally grasped in the edge portions the majority of the forces act in these regions. In order to give added strength to the regions, especially when wet, plastics film reinforcing tapes are included along each edge of the web. The tapes will withstand high forces and prevent the progation of tears from the edges across the web.

According to the invention there is provided an elongate parallel sided laminated web for use as a roll towel comprising; two layers of tissue paper extending substantially across the web; a perforated plastics film layer extending between the layers of tissue paper; and a tape in the form of a plastics film disposed along each edge region of the web between the layers of tissue paper. Preferably the plastics film layer is of non-woven material.

Although the tapes will withstand high forces they are not capable of completely protecting the web from the very high forces which are suddenly applied such as when the stop mechanism in the cabinet dispenser comes into operation. In order to withstand such forces special reinforcing threads extending parallel to the length of the web may be included at least in the edge regions of the web and at least some of these threads preferably extend in regions spaced inwardly of the inner edges of the reinforcing tapes. An embodiment of the present invention is described below with reference to the accompanying drawings in which:

Figure 1:
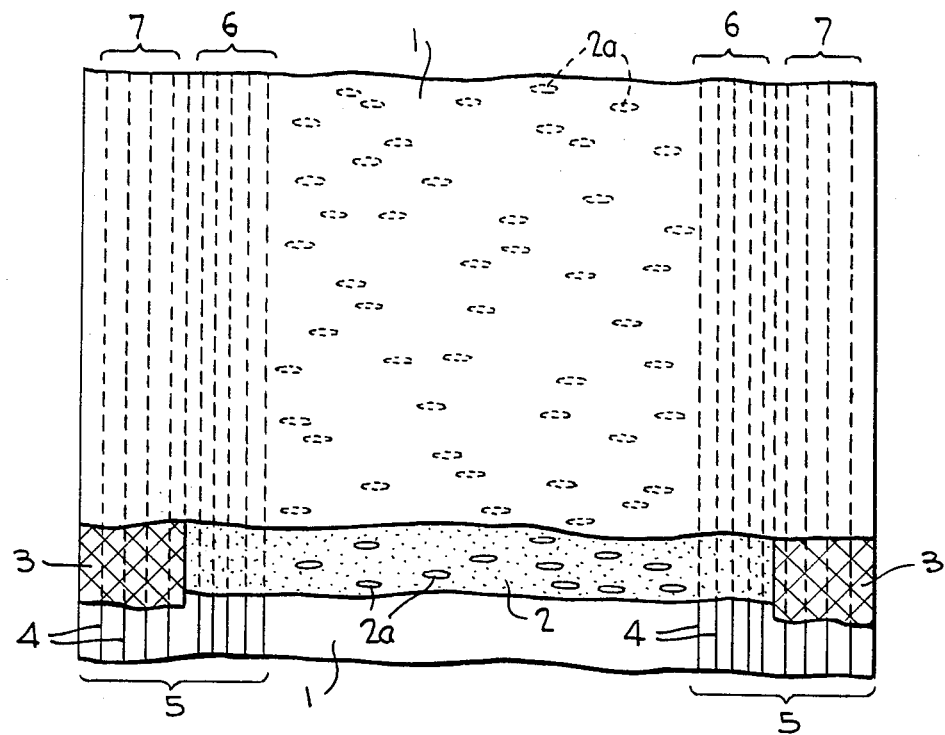
FIG. 1 shows a plan view of the web partly cut away.

The web comprises two layers of creped tissue paper 1 between which is adhered a non-woven perforated film layer 2 of plastics material. Reinforcing plastics film tapes 3 are provided along each edge of the web and reinforcing threads 4 are provided in the region of the tapes 3 and inwardly thereof. The web is held together by means of adhesive.

The outer layers of creped tissue paper 1 may be any suitable soft absorbent tissue and each layer will preferably have a minimum basis weight of around 15 g/m$^2$ and a maximum of around 80 g/m$^2$. The preferred weight is 26 g/m$^2$.

The interlayer 2 of perforated plastics film is suitably a polypropylene film having a basis weight of between 7 and 15 g/m$^2$. The preferred material is SCRINYL (Registered Trade Mark) manufactured by Beghin-Say S. A. comprising a polypropylene film reinforced with polyamide filaments and having a basis weight of 11 g/m$^2$ which is embossed and stretched to produce the required open structure with the perforations 2a.

Other plastics films, or spun bonded and woven mesh materials, may be used for the interlayer, so long as they have the correct drape and softness characteristics.

The function of the reinforcing tapes 3 is to retain the intergrity of the towel at its edges and to assist the threads to prevent bursting in the edge regions. A variety of plastics materials can be used for the tapes, such as soft plastics scrim or films made from polypropylene, polyethylene, polyamides and polyesters; these would have a basis weight of between 8 and 20 g/m$^2$ depending on the material. The tapes themselves may incorporate reinforcing filaments and the preferred material is a polypropylene film incorporating polyamide reinforcing filaments and having a basis weight of 15 g/m$^2$.

As the tapes diminish the softness and feel of the towel, it is important that their width is only sufficient to perform their reinforcing function. With a web width of 200 mm, the width of the tapes is preferably no more than 40 mm and suitably less than 30 mm e.g. 25 mm.

As discussed, it is important to have reinforcement of the web in areas where the towel is grasped by a user, particularly in the areas where the thumbs would normally be applied. In order to avoid using wider tapes, reinforcing threads in the form of multi-filament threads 4 are laid in the web direction in an edge region 5 approximately 60 mm in width along each edge of the web. The number of threads 4 laid in each edge region will vary depending on the material of the threads and the degree of reinforcement required. Suitably the threads are made of a plastics filament such as a polyester multi-filament material, although natural fibres like cotton may also be used. The threads may differ across the edge regions 5, for example a mixture of polyamide and polyester threads may be used. In a preferred embodiment, each edge region 5 contains five polyester multi-filament threads 6 of 280 g/10,000 m and four polyamide multi-filament threads 7 of 470 g/10,000 m. Threads of the same material but different diameters may also be used.

Figure 2:
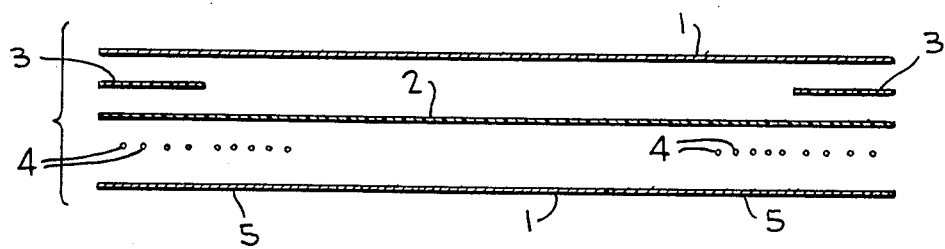
FIG. 2 shows a diagrammatic section through the web.

Although the threads 4 are shown in FIG. 2 as being on the opposite side of the film layer 2 from the tapes 3 they may be provided on the same side of the layer 2 and in this case may be provided on either side of the tapes 3. The threads may be provided right across the web but preferably are provided in regions extending only partly across the web; these regions being the regions which are grasped by the hands of a user.

The tapes and threads are applied to the laminate by a suitable adhesive such as PVA. The adhesive is applied to the layer 2 and to the tapes 3 by rollers. Adhesives may be applied to the threads 4 by running them through an adhesive bath.

It will be understood that the web forming one roll is manufactured from a wider web, e.g. 8 times wider. The tapes and threads are arranged at intervals across the wider web and are of twice the width required in each side of the final product. The web is then cut through the centres of the tapes to produce 8 rolls.

The breaking strength of a towel made in accordance with the invention can be extremely high, up to a 100 Kg across the full width.

A specific example of a preferred web construction and material is given below.

EXAMPLE

A web having a width of 200 mm was produced having outer layers formed from two sheets of creped absorbent tissue paper each of a basis weight of 26.5 g/m$^2$ and an inner layer of SCRINYL (Registered Trade Mark) manufactured by Beghin-Say S. A. The SCRINYL comprised a polypropylene film (95%) reinforced with polyamide threads (5%), embossed and stretched to produce the required open structure and having a basis weight of 11 g/m$^2$. The laminate was reinforced with tapes and threads running in the direction of the web which were adhered to the SCRINYL layer by PVA adhesive of 9 g/m$^2$ dry applied to the film and tapes by roller. Adhesive was also applied to the threads by running them through an adhesive bath. The tapes had a width of 2.5 cm and two were provided, one along each edge of the film. The tapers comprised a polypropylene film with polyamide reinforcing filaments in the machine direction, having a basis weight of 15 g/m$^2$. Nine polyester multifilament reinforcing threads were used on each side of the web spaced over a width of approximately 60 mm.

The total basis weight of the finished web was between 78 and 83 g/m$^2$ and the web had a full tensile breaking strain of approximately 80 Kg. The web had excellent resistance to tearing across its width and the threads provided good protection against bursting in the regions normally grasped by a user.

What is claimed is:

1. An elongate parallel sided laminated web for use as a roll towel comprising two layers of tissue paper extending substantially across said web; a perforated plastic film layer extending between said layers of tissue paper; a tape in the form of a plastic film disposed along each edge portion of said web between the layers of tissue paper, and spaced reinforcing threads running parallel to the length of said web and being provided at least in the regions of said tapes, said web having strength sufficient for use as a roll towel.

2. A laminated web as claimed in claim 1 wherein said perforated plastic film layer is non-woven.

3. A laminated web as claimed in claim 2 wherein said non-woven perforated plastic film layer comprises a film of polypropylene reinforced with polyamide filaments which has been embossed and stretched to provide the perforations.

4. A laminated web as claimed in claim 3 wherein said threads are provided in the regions of said tapes and inwardly thereof.

5. A laminated web as claimed in claim 4 wherein said tapes comprise a film of polypropylene reinforced with polyamide filaments.

6. A laminated web as claimed in claim 5 wherein at least some of the threads are polyester multi-filament threads.

7. A laminated web as claimed in claim 5 wherein at least some of the threads are polyamide multi-filament threads.

* * * * *